US005719370A

United States Patent [19]

Apunevich et al.

[11] Patent Number: 5,719,370

[45] Date of Patent: Feb. 17, 1998

[54] ELECTRIC ARC PLASMA-STEAM TORCH

[75] Inventors: Alexandr Ivanovich Apunevich, Moscow; Evgeny Ivanovich Titarenko, Zelenograd, both of Russian Federation

[73] Assignee: Adamas AT AG, Geilenkirchen, Germany

[21] Appl. No.: 663,147

[22] PCT Filed: Dec. 16, 1994

[86] PCT No.: PCT/RU94/00277

§ 371 Date: Jun. 10, 1996

§ 102(e) Date: Jun. 10, 1996

[87] PCT Pub. No.: WO95/17278

PCT Pub. Date: Jun. 29, 1995

[30] Foreign Application Priority Data

Dec. 17, 1993 [RU] Russian Federation ........ 93056099/25

[51] Int. Cl.[6] ........ B23K 10/00

[52] U.S. Cl. ........ 219/121.49; 219/75; 219/121.36; 219/121.5

[58] Field of Search ........ 219/121.36, 121.48, 219/121.49, 121.59, 74, 75, 121.5; 313/231.31

[56] References Cited

U.S. PATENT DOCUMENTS 4,743,734 5/1988 Raboti .

5,247,152 9/1993 Blankenship .

FOREIGN PATENT DOCUMENTS 0 426 289 A3 9/1990 European Pat. Off. .

0426289 3/1991 European Pat. Off. .

1731029 A1 12/1990 U.S.S.R. .

19139 9/1994 WIPO .

*Primary Examiner*—Mark H. Paschall

*Attorney, Agent, or Firm*—Collard & Roe, P.C.

[57] ABSTRACT

The electric-arc plasma-steam torch has a housing accommodating coaxially arranged therein a nozzle anode and a cathode made fast in a holder. The housing communicates, via a pipe connector filled with a porous heat-conducting material, with a container. The container is filled with a moisture absorbent material which encompasses a tube running therethrough and made of a heat-conducting material. The tube has a flange at its end facing the nozzle anode. The flange is provided with passages on its end surface facing the nozzle anode. The aforementioned cathode holder is accommodated in the tube and is electrically insulated therefrom. A sleeve made of a heat-conducting material is interposed between the nozzle anode and the tube flange. The sleeve has passages on its outside cylindrical surface and on the surface contacting the nozzle anode. Steam resultant from the torch operation, is admitted, through the aforementioned passages, to the cathode and the nozzle anode, respectively, cools them and stabilizes the arc column by constricting the latter.

2 Claims, 2 Drawing Sheets

ELECTRIC ARC PLASMA-STEAM TORCH

TECHNICAL FIELD

The present invention relates to electric-arc generators of low-temperature plasma, that is, to plasma-steam torches and can find application in mechanical engineering, as well as in the motor, aircraft, electrical-engineering and other industries for performing diverse kinds of plasma treatment, such as cutting, welding, and heat-treatment of the surfaces of various materials.

More specifically the invention relates to those low-temperature plasma generators (plasmatrons) which make use of steam as the working medium.

BACKGROUND ART

Known in the prior art are plasma generators making use of steam as the working medium. In this case steam may be supplied to the generator from a special source or be produced immediately in the generator due to high temperatures therein. Besides, the steam generating process may be combined with heat withdrawal from the plasmatron electrodes.

A widespread technical solution to the problem of carrying out said process is admission of the liquid being evaporated through passages in the electrodes, said liquid evaporating while flowing along said passages, at the same time cooling the electrodes (PCT FI 88/00427: FR, A, 1,620,032).

The prior art closest to the herein-proposed solution is the construction of a plasma torch as taught in RF Patent 1,731,029. The plasma torch comprises a housing which accommodates coaxially arranged a nozzle anode and a central rod-shaped cathode fitted in a holder encompassed with a cylinder made of a heat-conducting material and provided with tangential passages. Connected to the housing is a container for a liquid coolant, filled with a moisture absorbent that encompasses a porous tube forced onto the cathode holder.

When an arc is stricken across the electrodes, heat energy released thereby causes the liquid coolant to boil, and the resultant steam escapes through the tangential passages into the discharge chamber and further on, as a plasma jet, through a central axial port of the nozzle anode.

The torch discussed before suffers from a restricted electrode cooling abilities, that is, it fails to provide heat abstraction when the nozzle-anode-to-cathode distance exceeds 1.5 to 2 mm. At a larger distance the arc power and the amount of heat evolved on the electrodes increase so that cooling of the cathode becomes inadequate, whereby the cathode is liable to get destructed rapidly. On the other hand, restriction of the interelectrode distance to the aforesaid values reduces the working range of the torch power output.

DISCLOSURE OF THE INVENTION

The present invention has for its principal object to provide an electric arc plasma-steam torch featuring an efficient cooling of electrodes within an extended range of power output.

The foregoing object is accomplished due to the fact that in a plasma-steam torch, comprising a housing which accommodates coaxially arranged a nozzle anode and a rod-shaped cathode made fast in a holder, said housing being connected, through a pipe connector filled with a porous heat-conducting material, to a container for a working fluid, filled with a moisture absorbent that encompasses a tube made of a heat-conducting material, said tube having a flange with passages at its end facing the nozzle anode and accommodating said electrically insulated cathode holder, according to the invention, a sleeve is interposed between the tube flange and the nozzle anode, said sleeve being made of a heat-conducting material and having passages on its end surface facing the nozzle anode and on the outside cylindrical surface thereof.

BRIEF DESCRIPTION OF THE DRAWINGS

The essence of the present invention is illustrated by the accompanying drawings, wherein.

BEST EMBODIMENT OF THE INVENTION

Figure 1:
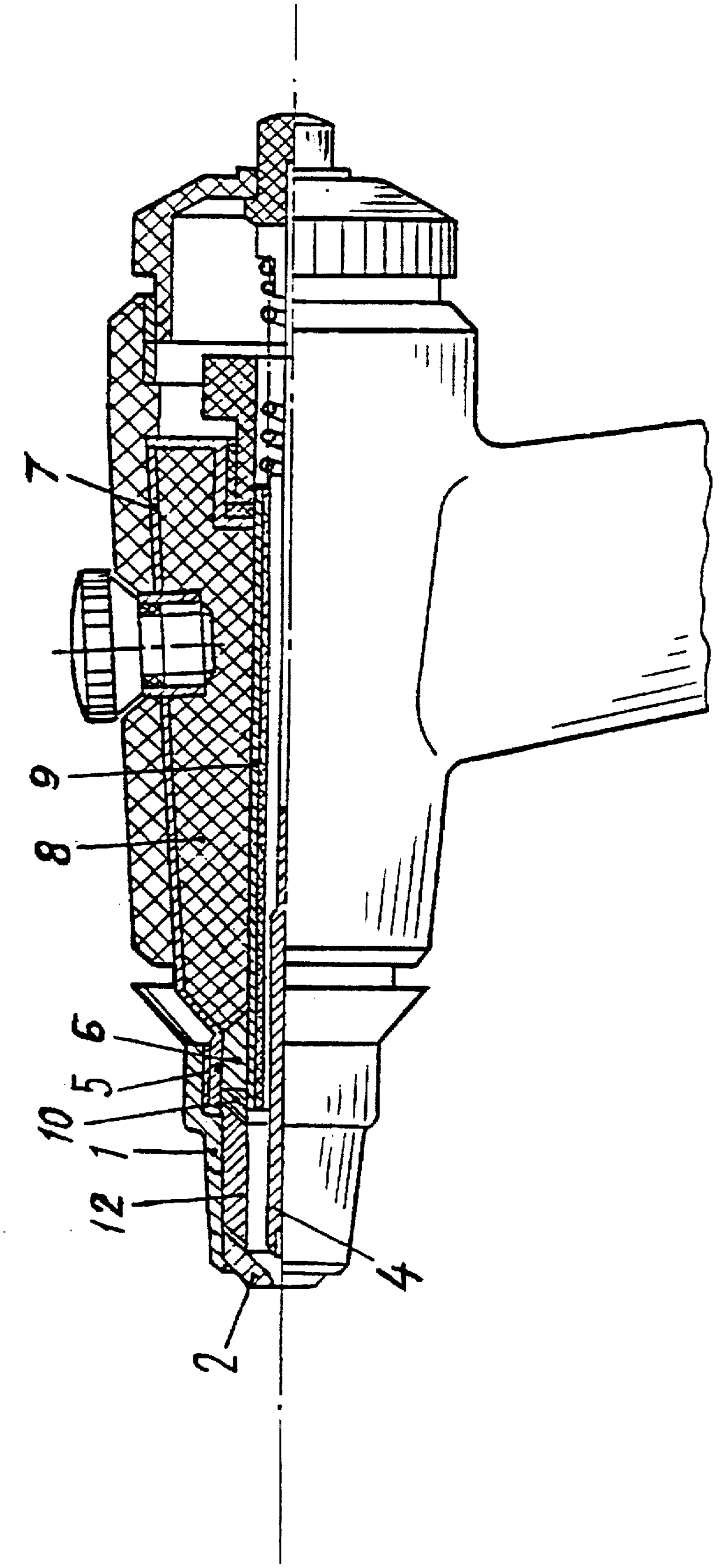
FIG. 1 shows a schematic general view of the torch.
Figure 2:
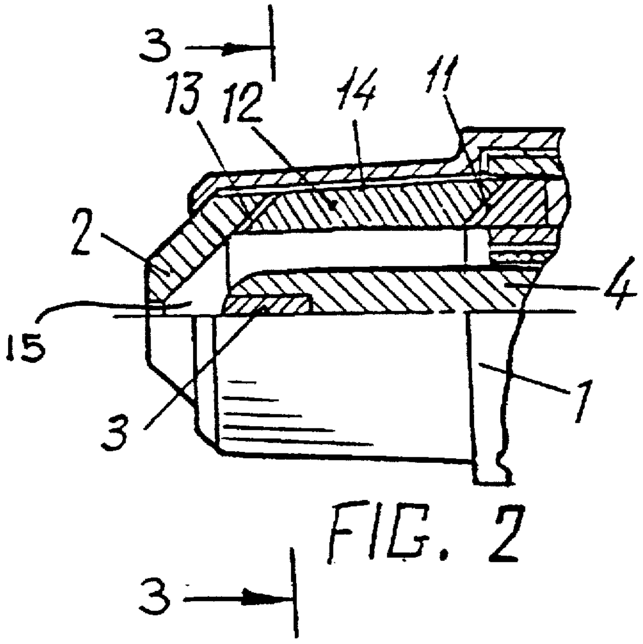
FIG. 2 shows the torch housing.
Figure 3:
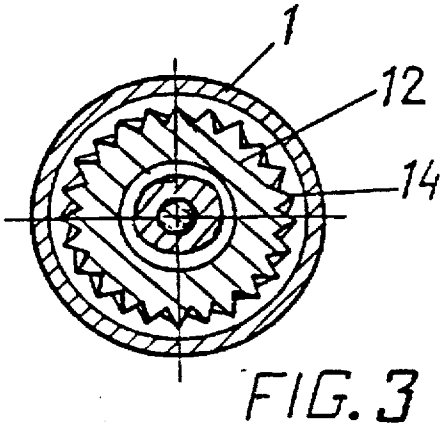
FIG. 3 is a section taken along the line AA in FIG. 2.
Figure 4:
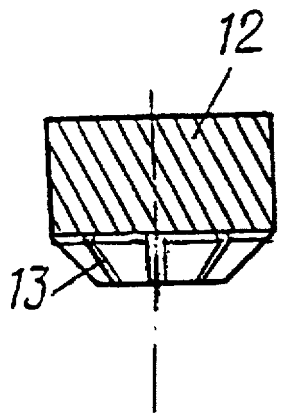
FIG. 4 is a view of the sleeve on the arrow B.

The torch has a housing 1 accommodating coaxially arranged an exit nozzle anode 2 and a rod-shaped cathode 3 made fast in a holder 4. The housing 1 is connected, through a pipe connector 5 filled with a porous heat-conducting material 6, to a container 7 for the working fluid, said container being filled with a moisture absorbent 8 that encompasses a tube 9 made of a heat-conducting material and having a flange 10 at its side facing the nozzle anode, said flange being provided with passages 11 made on its surface facing the nozzle anode and, which flange is in contact with the porous material 6. The tube 9 encompasses said holder 4 of the cathode 3 and is electrically insulated therefrom. A sleeve 12 is interposed between the flange 10 and the nozzle anode 2, said sleeve being made of a heat-conducting material and having passages 13 on its end surface facing the nozzle anode, and passages 14 on the outside cylindrical surface thereof.

The torch of the present invention operates as follows. The container 7 is filled with the working fluid (water) and a voltage is applied from a power source to the anode and cathode, thus initiating an electric arc across arc chamber 15. The energy evolved on the nozzle anode 2 and resultant from current flowing, heats it up and is admitted, through the sleeve 12, the flange 10, the porous material 6, and the tube 9, to pass to the water held in the container 7. Hence the water turns into steam, an excess pressure is built up under the effect of which steam is passed into the discharge chamber via the passages 11, 14, and 13. The steam flowing along the passages 11 cools the cathode, while the steam running along the passages 14 and 13 cools the nozzle anode 2.

A flow of steam in the discharge chamber constricts an electric-arc column between the anode and cathode, thus getting heated up to a high temperature and, while escaping through the nozzle port, builds up a plasma jet.

Two stages of steam supply through the passages are established in the proposed torch construction, viz. the stage of steam supply to the cathode via the passages 10, and the stage of steam supply to the anode through the passages 14 and 13 provided on the sleeve 12 incorporated into the torch construction.

INDUSTRIAL APPLICABILITY

The herein-proposed torch construction allows of optimizing the flow of steam for cooling the anode and cathode due to modified number, shape, and dimensions of the passages on the sleeve.

Apart from a higher degree of electrode cooling in the proposed torch, the steam that flows along the passages 10 stabilizes the arc column with the cathode in any position, thus enabling one to effect a wide range stepless control of the torch heat output power.

We claim:

1. An electric arc plasma-stream torch using water stream as a working medium comprising:

a housing (1);

a nozzle anode (2) and a rod-shaped cathode (3) coaxially arranged in said housing;

an arc chamber (15) formed between said nozzle anode (2) and said rod-shaped cathode (3);

a holder (4) adapted to retain said rod-shaped cathode (3) within said housing;

a pipe connector (5) coupled to said housing at one end and being filled with a porous heat conducting material;

a container (7) connected to the other end of said pipe connector (5) and having a filling opening, said container (7) being filled with a moisture absorbent for binding the water;

a tube (9) running through said container (7) and having a first end in communication with said container (7) and a second end facing said nozzle anode (2), said second end having a flange (10) including a plurality of passages (11), said holder (4) being electrically insulated from and disposed within said tube (9); and a sleeve (12) interposed between said nozzle anode (2) and said flange (10), said sleeve comprising a heat conducting material and having a plurality of passages (13, 14) on its outside surface adapted to pass stream to said arc chamber (15) such that said nozzle anode (2) is cooled with a stream of stream.

2. An improved electric arc plasma-steam torch using water steam as a working medium and having a housing (1), a nozzle anode (2) and a rod-shaped cathode (3) coaxially arranged in said housing, an arc chamber (15) formed between said nozzle anode (2) and said rod-shape cathode (3), a holder (4) adapted to retain said rod-shaped cathode (3) within said housing, a pipe connector (5) coupled to said housing at one end and being filled with a porous heat conducting material, a container (7) connector to the other end of said pipe connector (5) and having a filling opening, said container (7) being filed with a moisture absorbent for binding the water, a tube (9) running through said container (7) and having a first end in communication with said container (7) and a second end facing said nozzle anode (2), said second end having a flange (10) including a plurality of passages (11), said holder (4) electrically insulted from and disposed within said tube (9), the improvement comprising;

a sleeve (12) interposed between the nozzle anode (2) and the flange (10), said sleeve comprising a heat conducting material and having a plurality of steam passages (13, 14) on its outsisde surface adapted to pass steam to the arc chamber (15) such that the nozzle anode (2) is cooled with the stream of steam.

* * * * *